United States Patent
Chang et al.

(10) Patent No.: US 8,121,711 B2
(45) Date of Patent: Feb. 21, 2012

(54) SYSTEM AND METHOD FOR CONTROLLING MOVEMENT OF A MEASUREMENT MACHINE

(75) Inventors: Chih-Kuang Chang, Taipei Hsien (TW); Hua-Wei Yang, Shenzhen (CN)

(73) Assignees: Hong Fu Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 367 days.

(21) Appl. No.: 12/494,285

(22) Filed: Jun. 30, 2009

(65) Prior Publication Data

US 2010/0030349 A1 Feb. 4, 2010

(30) Foreign Application Priority Data

Jul. 31, 2008 (CN) .......................... 2008 1 0303293

(51) Int. Cl.
*G05B 15/00* (2006.01)
*G05B 19/18* (2006.01)
(52) U.S. Cl. .......................................... 700/85; 700/63
(58) Field of Classification Search ..................... 700/63, 700/85
See application file for complete search history.

(56) References Cited

U.S. PATENT DOCUMENTS

| | | | | |
|---|---|---|---|---|
| 4,795,952 A * | 1/1989 | Brandstetter | ................. | 318/560 |
| 5,198,990 A * | 3/1993 | Farzan et al. | ................. | 702/168 |
| 6,058,618 A * | 5/2000 | Hemmelgarn et al. | ......... | 33/503 |
| 6,108,613 A * | 8/2000 | Kimura et al. | ................. | 702/150 |
| 6,282,461 B1 * | 8/2001 | Gan et al. | ...................... | 700/258 |
| 7,039,550 B2 * | 5/2006 | Noda | .............................. | 702/168 |
| 7,392,692 B2 * | 7/2008 | Noda | .............................. | 73/105 |
| 2009/0109285 A1 * | 4/2009 | Tobiason et al. | ................ | 348/79 |
| 2010/0039391 A1 * | 2/2010 | Spink et al. | .................... | 345/173 |

OTHER PUBLICATIONS

Machine Translation of JP 2005-003583 A.*

* cited by examiner

*Primary Examiner* — Ryan Jarrett
(74) *Attorney, Agent, or Firm* — Altis Law Group, Inc.

(57) ABSTRACT

Controlling movement of movable arms on motion shafts of a measurement machine is disclosed. Each motion shaft of the measurement machine are divided into different motion ranges. The movable arms move in different motion ranges at different speeds. Motion direction of the movable arms is associated with an operation direction of a joystick.

19 Claims, 8 Drawing Sheets

SYSTEM AND METHOD FOR CONTROLLING MOVEMENT OF A MEASUREMENT MACHINE

BACKGROUND

1. Technical Field

Embodiments of the present disclosure relate to movement control systems and methods, and more particularly to a system and method for controlling movement of a measurement machine.

2. Description of Related Art

Some measurement machines may include manual control devices, such as a joystick. Thus, movement of a measurement machine may be controlled by a joystick. However, undesired and inaccurate movement of the measurement machine may happen due to manual operations of the joystick.

Therefore, an effective system and method for controlling movement of a measurement machine is desired to overcome the above-described shortcomings.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
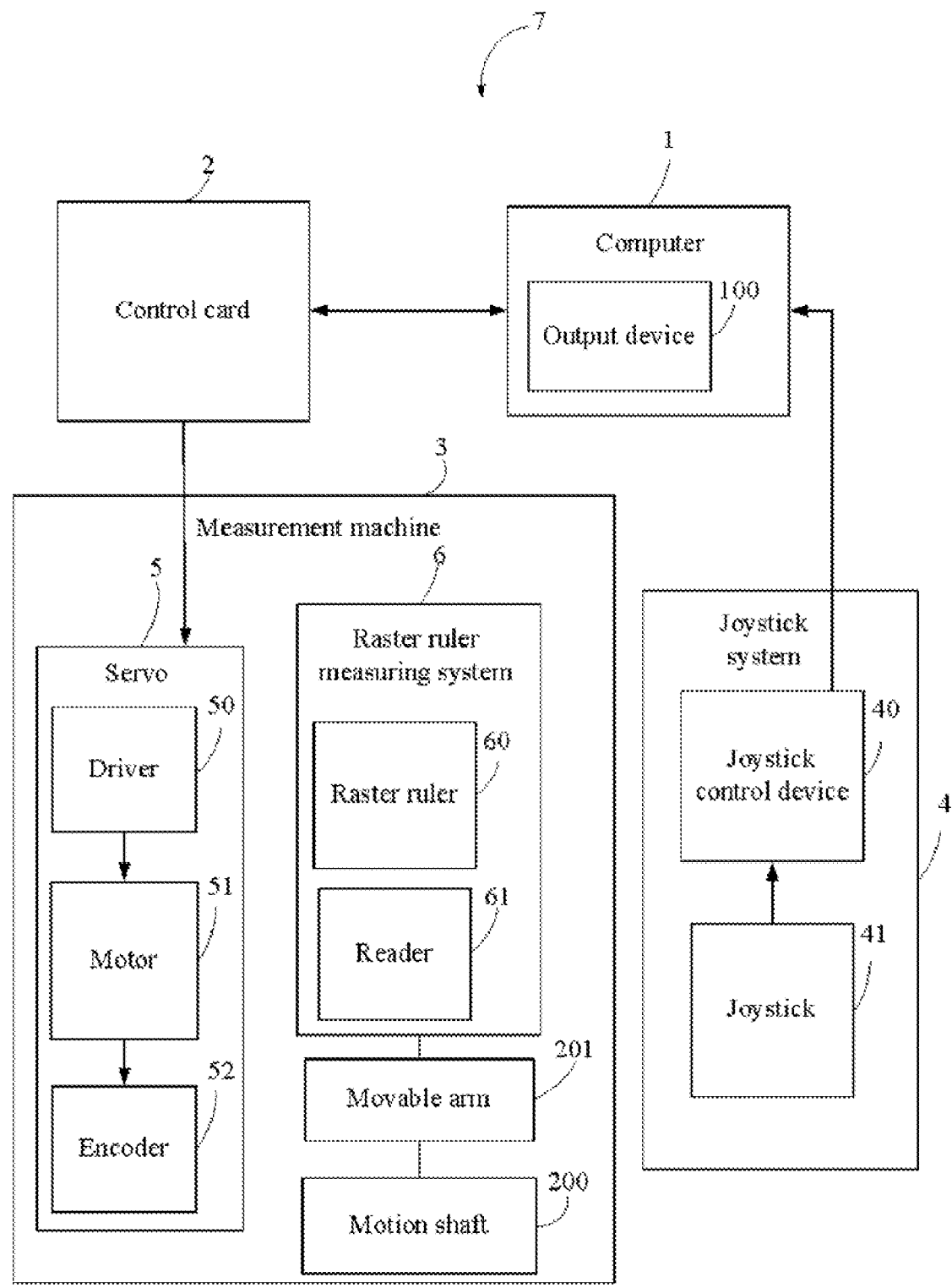
FIG. 1 is a block diagram of one embodiment of a system for controlling movement of a measurement machine.

FIG. 1 is a block diagram of one embodiment of a system 7 for controlling movement of a measurement machine 3. The system 7 includes a computer 1, a control card 2, the measurement machine 3, and a joystick system 4. In one embodiment, the joystick system 4 includes a joystick control device 40 and a joystick 41 connected to the joystick control device 40.

The control card 2 connected to the computer 1 is to receive a speed and a motion direction of the measurement machine 3 sent from the computer 1 using a communication protocol, such as the Recommended Standard 232 (RS-232) protocol or Transmission Control Protocol/Internet Protocol (TCP/IP).

The measurement machine 3 includes a servo 5, a raster ruler measurement system 6, and three motion shafts 200 (only one shown). The control card 2 is connected with the servo 5 via signal lines. The three motion shafts 200 are in spatial direction, and include an X-axis shaft, a Y-axis shaft, and a Z-axis shaft. There is a movable arm 201 moving on each motion shaft 200 separately. The raster ruler measurement system 6 includes at least one raster ruler 60 (only one shown) and at least one reader 61 (only one shown). The reader 61 is for reading data on the raster ruler 60. Each movable arm is fixed with a raster ruler 60 and a reader 61.

The computer 1 is connected to the joystick control device 40 via a RS-232 port or a universal serial bus (USB) port. In one embodiment, the computer 1 obtains a motion offset A of the joystick 41. The motion offset denotes a distance between an initial position of the joystick 41 and a position that the joystick operated to reach. The computer 1 is also to set speeds and moving directions of the measurement machine 3. For example, when the joystick 41 is operated by a user, the joystick 41 sends an analog signal to the joystick control device 40. The joystick 40 converts the analog signal into a digital signal and sends the digital signal to the computer 1. The computer 1 sets a speed and a moving direction of the measurement machine 3 according to the digital signal. The computer 1 includes an output device 100 to display a position of each movable arm moving on each motion shaft 200. In one embodiment, the output device 100 may be a display.

The servo 5 includes a driver 50, a motor 51 connected to the driver 50, and an encoder 52 connected to the motor 51. The servo 5 controls movement of the movable arms 201 on the motion shafts 200 according to instructions sent by the control card 2.

Figure 2:
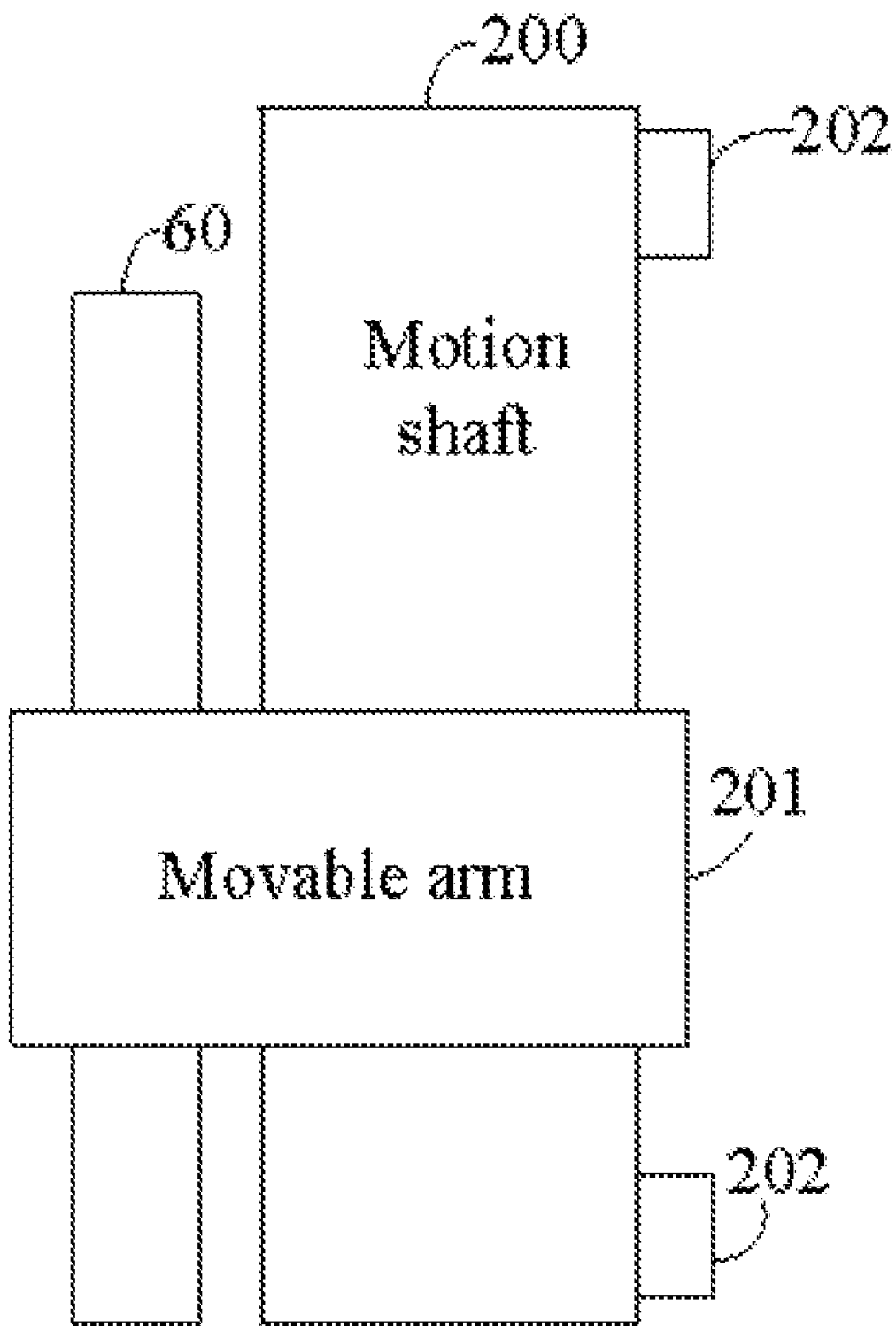
FIG. 2 is a schematic diagram illustrating one embodiment of a motion shaft of the measurement machine in FIG. 1.

FIG. 2 is a schematic diagram illustrating one embodiment of a motion shaft 200 of the measurement machine 3. The motion shaft 200 includes the movable arm 201 which can move on the shaft 200. The movable arm 201 is fixed with the raster ruler 60 and the reader 61 (not shown in FIG. 2). When the movable arm 201 moves on the motion shaft 200, the reader 61 moves with the movable arm 201 and reads a position data which denotes a distance of the movable arm 201 moving on the raster ruler 60. The reader 61 sends an analog signal to the control card 2 according the position data. The control card 2 converts the analog signal to a digital signal, and sends the digital signal to the computer 1. The computer 1 computes a value of the digital signal and outputs the value via the output device 100. There are two limit switches 202 fixed on the shaft 200. In one embodiment, the positions of the two limit switches 202 are set as hard limit positions. There are two soft limit positions on the shaft. The soft limit positions can be set by the control card 2.

Figure 3:
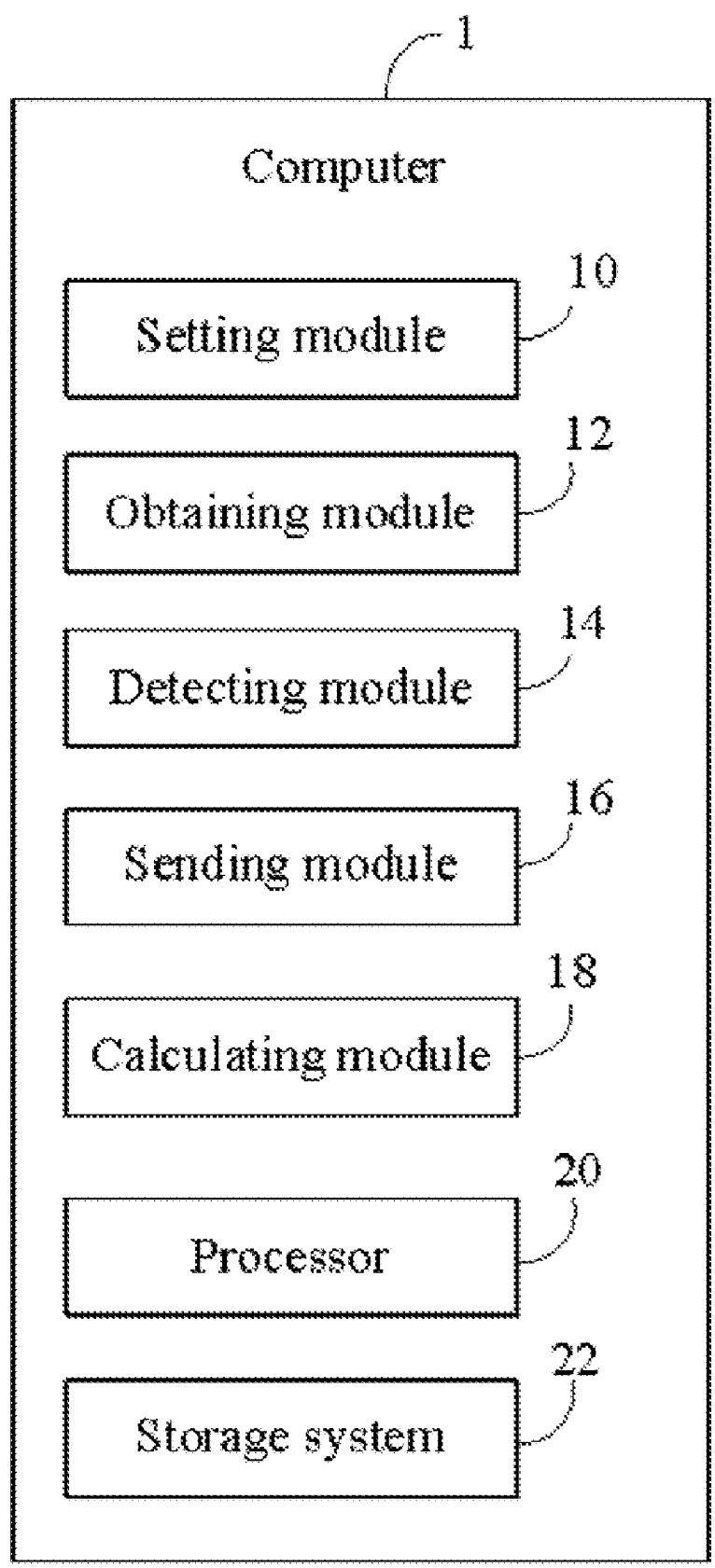
FIG. 3 is a block diagram of one embodiment of function modules of a computer in FIG. 1.

FIG. 3 is a block diagram of one embodiment of function modules of the computer 1. In one embodiment, the computer 1 may include a setting module 10, an obtaining module 12, a detecting module 14, a sending module 16, and a calculating module 18. It may be understood that one or more specialized or general purpose processors, such as a processor 20, may be used to execute one or more computerized codes of the function modules 10-18. The or more computerized codes of the functional modules 10-18 may be stored in a storage system 22.

The setting module 10 is to set motion parameters of the movable arm 201. The motion parameters include a threshold "B" of the motion offset A of the joystick 4, a compensation value of the joystick 4, a maximum speed "$V_{max}$" of the movable arm 201, motion ranges of the movable arm 201 moving on the motion shaft 200, and the motion direction of the movable arm 201 associated with an operating direction of the joystick 4. The motion ranges may include a normal motion range, a first deceleration motion range, and a second deceleration motion range. In one embodiment, a maximum operating angle of the joystick 4 is averagely divided into a plurality of shares. The number of the shares is regarded as the value of the threshold "B" of the motion offset A of the joystick 4. For example, if the maximum operating angle of the joystick 4 is averagely divided into 8000 shares, then B is 8000.

The compensation value of the joystick 4 is used to compensate the motion offset A of the joystick. It may be understood that, the initial position of the joystick 4 may not be in a precise initial position due to some error. In such a situation, the compensation value is needed to compensate for the initial position. For example, if the setting module 10 sets the compensation value as 10, any position in the position range [−10, 10] is regarded as the initial position of the joystick 4.

Figure 4:
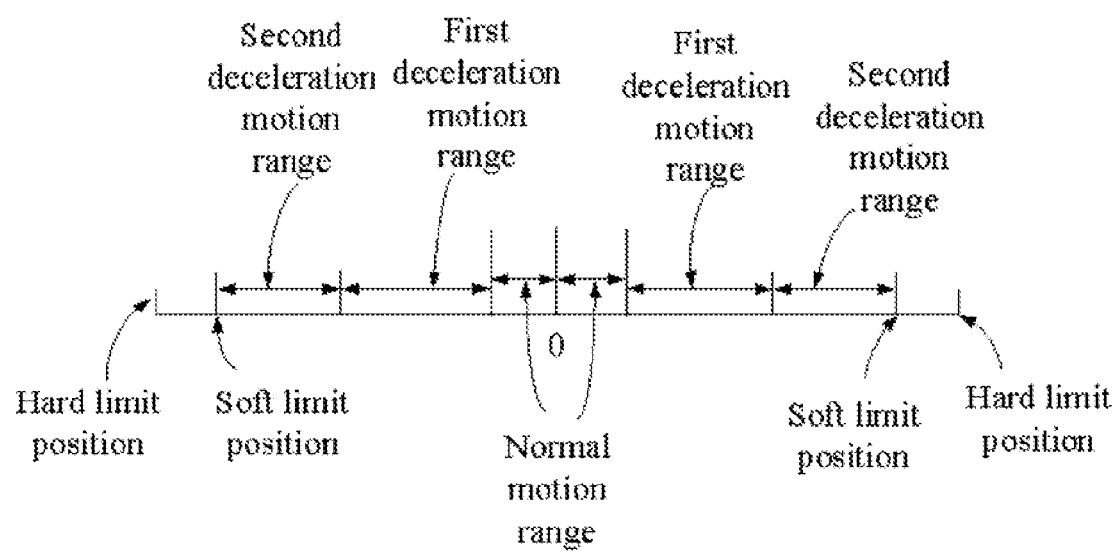
FIG. 4 is a schematic diagram illustrating one embodiment of motion ranges of the motion shaft in FIG. 2.

In one embodiment, as shown in FIG. 4, the first deceleration motion range of the movable arm 201 is far from the soft limit position, such as 4 mm~10 mm, and the second deceleration section is far from the soft limit position, such as 0 mm~4 mm.

The obtaining module 12 obtains the motion offset A of the joystick when the joystick 4 is operated by a user.

The detecting module 14 checks if the motion offset A equals a predetermined value, such as zero. If the motion offset A does not equal zero, the detecting module 14 checks if the motion offset A is more than zero. The detecting module 14 is also to detect if the movable arm 201 moves in the first deceleration motion range. If the movable arm 201 does not move in the first deceleration motion range, the detecting module 14 detects if the movable arm 201 moves in the second deceleration motion range.

The sending module 16 sends a stop instruction to stop movement of the movable arm 201 to the control card 2 if the motion offset A equals zero.

Figure 7:
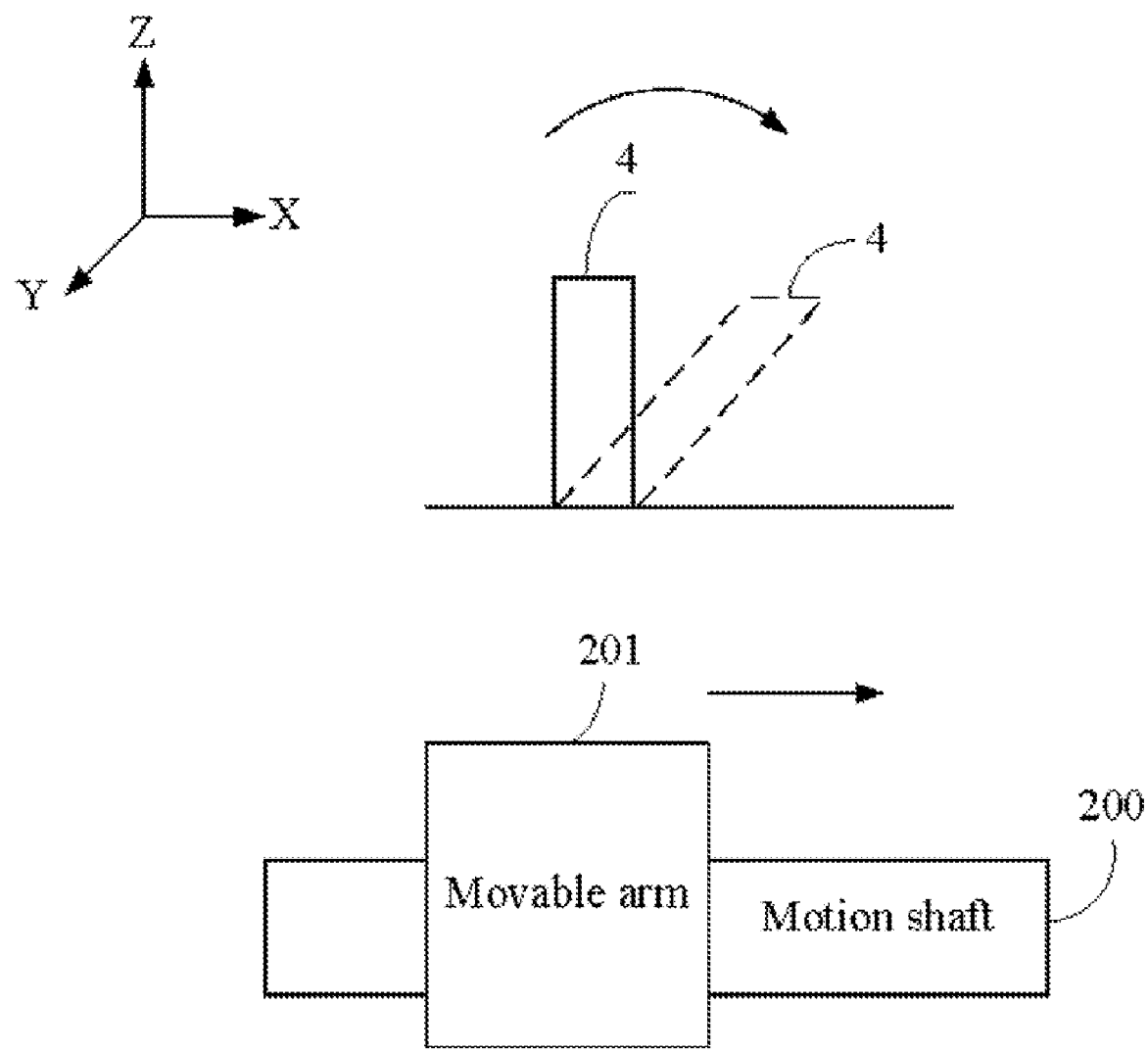
FIG. 7 and FIG. 8 illustrate one embodiment of association between a motion direction of a movable arm and a operating direction of a joystick.
Figure 8:
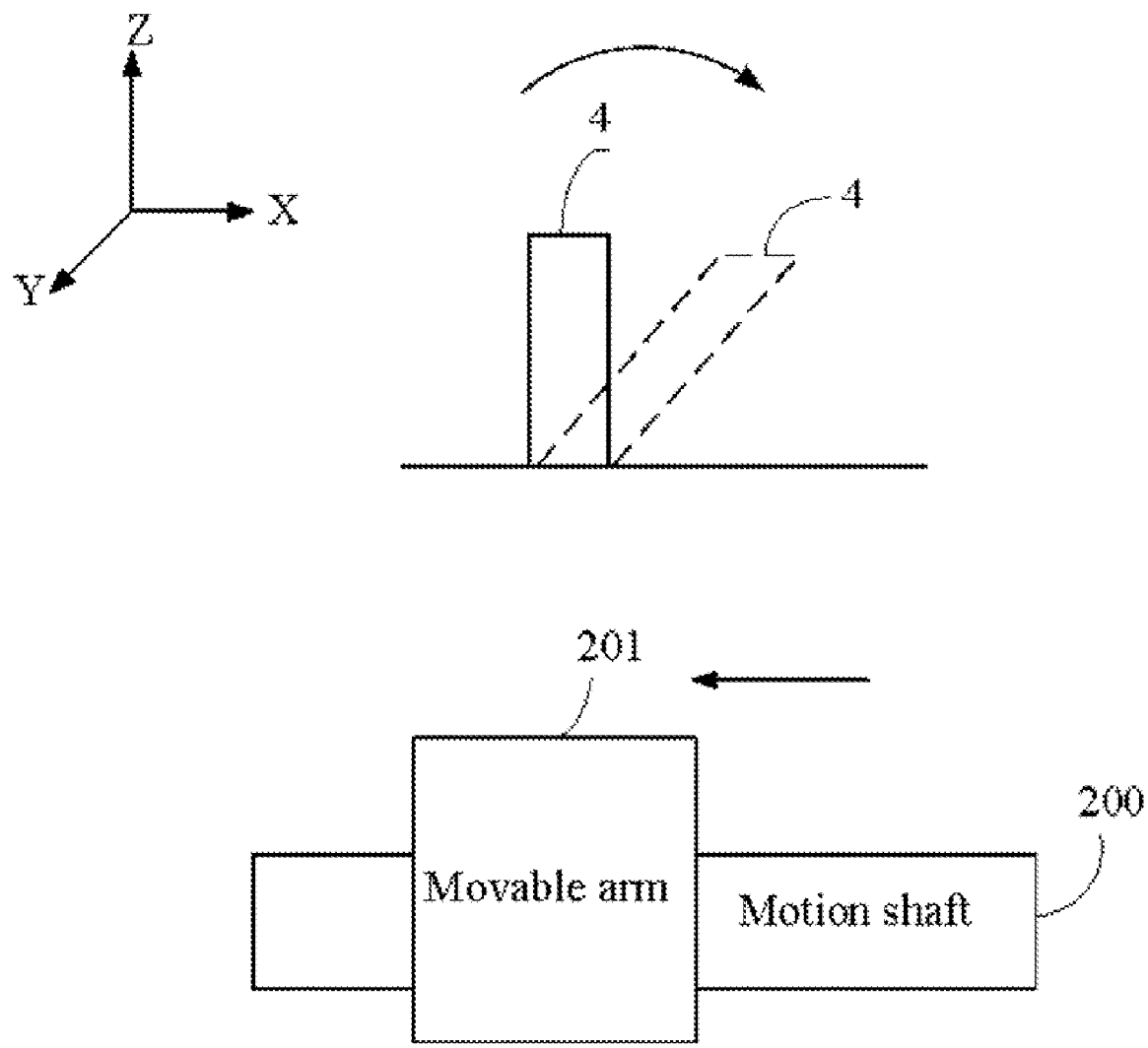

If the motion offset A does not equal zero, the setting module 10 sets an association between a motion direction of the movable arm 201 and the operating direction of the joystick 4 according to the motion offset A. In one embodiment, if the motion offset A is more than zero, the setting module 10 sets the motion direction of the movable arm 201 as a predetermined direction. If the motion offset A is less than zero, the setting module 10 sets the motion direction of the movable arm 201 as an opposite direction of the predetermined direction. For example, the setting module 10 sets a positive axis of the X-axis shaft associated with the X-axis operating direction of the joystick 4. If the motion offset A is more than zero and the joystick 4 is operated in the direction of X-axis, as shown in FIG. 7, the setting module 10 sets the motion direction of the movable arm 201 as the positive axis of the X-axis shaft. If the motion offset A is less than zero, as shown in FIG. 8, the setting module 10 sets the motion direction of the movable arm 201 as the negative axis of the X-axis shaft.

The calculating module 18 is to calculate a first speed "V" of the movable arm 201 according to the motion offset A and the threshold B of the motion offset A when the movable arm 201 moves in the normal motion range of the shaft 200. A formula of calculating the first speed is as follows: $V=V_{max}*[(A/B)^8*0.85+(A/B)^2*0.15]$. If the movable arm 201 moves in the first deceleration motion range of the shaft 200, the setting module 10 sets a second speed "V1" of the movable arm 201, and $0<V1<V_{max}/2$. If the movable arm 201 moves in the second deceleration motion range of the shaft 200, the setting module 10 sets a third speed "V2" of the movable arm 201, and $0<V2<V_{max}/10$.

The sending module 16 is further to send a shifting instruction to control the movable arm 201 to move at a corresponding set speed along the set moving direction to the control card 2. The servo 5 of the measurement machine 3 receives the shifting instruction. The driver 50 outputs a pulse width modulation (PWM) signal to drive the motor 51. The encoder 52 outputs a reply PWM signal to the driver 50 when the motor 51 is driven. The driver 50 controls the movable arm 201 to move at the set speed along the set moving direction after receiving the reply PWM signal.

If the movable arm 201 does not moves in the second deceleration motion range of the shaft 200, the detecting module 14 is also to detect if the movable arm 201 reaches the limit position. In one embodiment, the limit position may be the hard limit position or the soft limit position. If the movable arm 201 reaches the limit position, the sending module 16 sends a stop instruction to the control card 2. The control card 2 sends the stop instruction to the measurement machine 3. The measurement machine 3 controls the movable arm 201 to stop moving.

Figure 5:
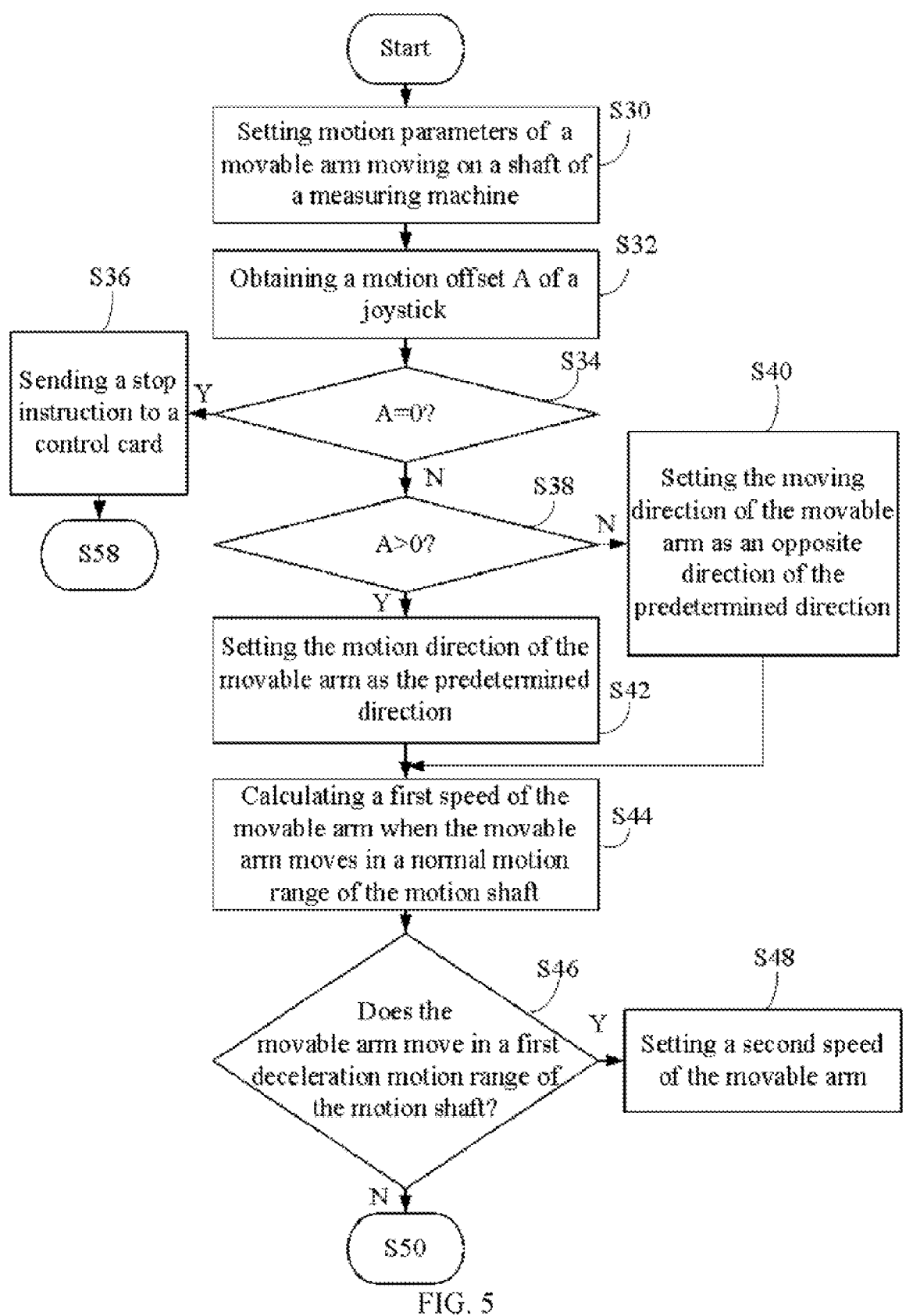
FIG. 5 and FIG. 6 illustrate a flowchart of one embodiment of a method for controlling movement of a measurement machine.
Figure 6:
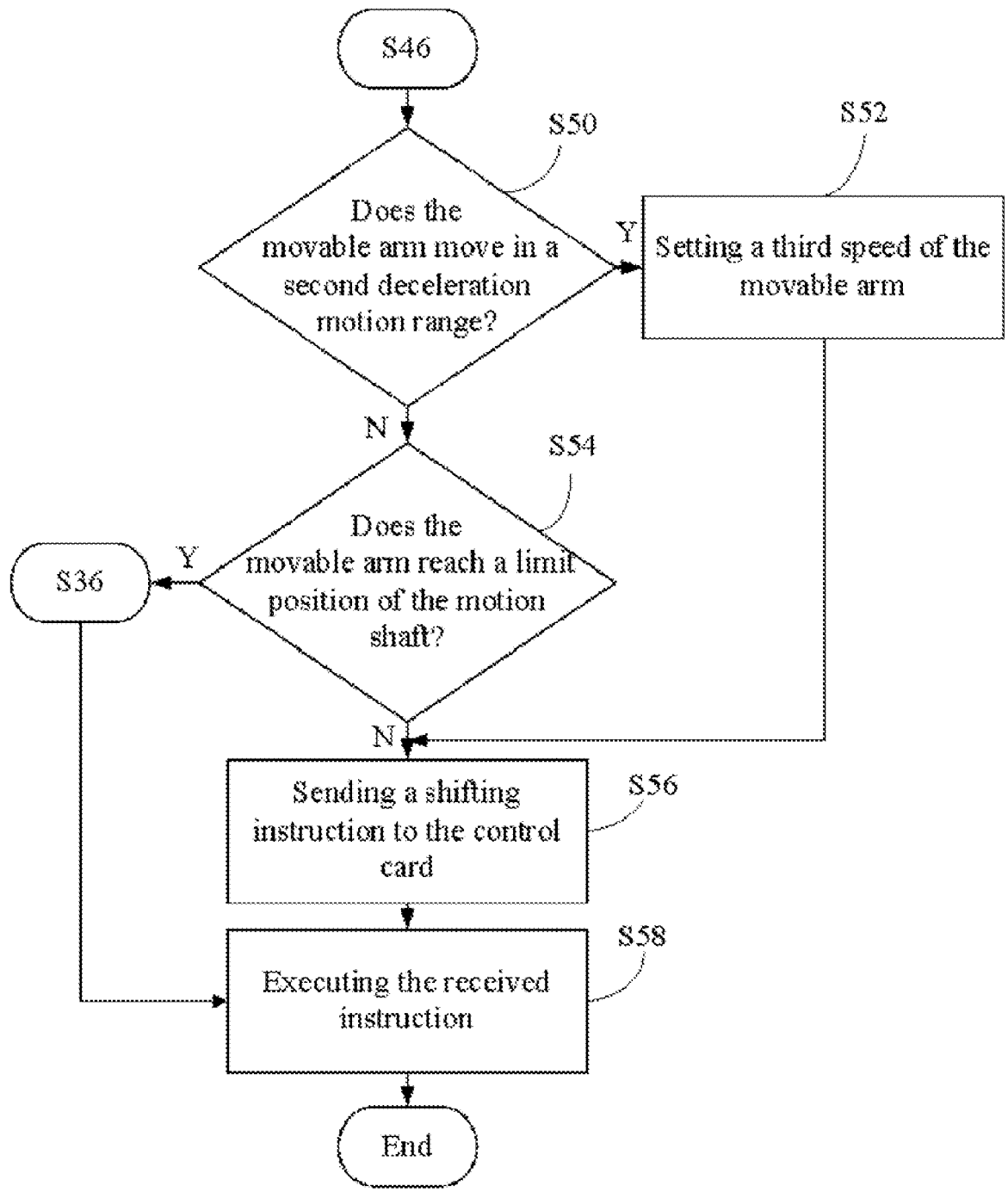

FIG. 5 and FIG. 6 illustrate a flowchart of one embodiment of a method for controlling movement of a measurement machine.

In block S30, the setting module 10 sets motion parameters of the movable arm 201. The motion parameters include a threshold "B" of a motion offset A of the joystick 4, a compensation value of the joystick 4, a maximum speed "$V_{max}$" of the movable arm 201, motion ranges of the movable arm 201 moving on the shaft 200, and the motion direction of the movable arm 201 associated with an operating direction of the joystick 4.

In block S32, when the joystick 4 is operated, the obtaining module 12 obtains the motion offset A of the joystick 4.

In block S34, the detecting module 14 checks if the motion offset A equals zero. If the motion offset A equals zero, in block S36, the sending module 16 sends a stop instruction to stop movement of the movable arm 201 to the control card 2, then the procedure goes to block S58. If the offset A does not equal zero, the procedure goes to block S38.

In block S38, the detecting module 14 detects if the motion offset A is more than zero. If the offset A is less than zero, in block S40, the setting module 10 sets the moving direction of the movable arm 201 as an opposite direction of the predetermined direction.

In block S42, the setting module 10 sets the motion direction of the movable arm 201 as the predetermined direction.

In block S44, the calculating module 18 calculates a first speed "V" of the movable arm 201 according to the motion offset A and the threshold B.

In block S46, the detecting module 14 detects if the movable arm 201 moves in the first deceleration motion range. If the movable arm 201 moves in the first deceleration motion range, in block S48, the setting module 10 sets a second speed "V1" of the movable arm 201. If the movable arm 201 does not move in the first deceleration motion range, the procedure goes to block S50.

In block S50, the detecting module 14 detects if the movable arm 201 moves in the second deceleration motion range. If the movable arm 201 moves in the second deceleration motion range, in block S52, the setting module 10 sets a third speed "V2" of the movable arm 201. If the movable arm 201 does not move in the second deceleration motion range, the procedure goes to block S54.

In block S54, the detecting module 14 detects if the movable arm 201 reaches the limit position. If the movable arm 201 reaches the limit position, in procedure returns to block S36. If the movable arm 201 does not reach the limit position, in block S56, the sending module 16 sends a shifting instruction to control the movable arm 201 to move at a corresponding set speed along the set moving direction to the control card 2.

In block S58, the control card 2 sends the stop instruction or the shifting instruction to the measurement machine 3. The measurement machine 3 executes the instructions.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for controlling movement of a measurement machine, the system comprising a computer connected to the measurement machine via a control card, the computer comprising:
    at least one processor executing programs stored in a storage system of the computer, the programs comprising:
    a setting module to set motion ranges of a movable arm moving on a motion shaft of the measurement machine, the motion ranges comprising a normal motion range, a first deceleration motion range and a second deceleration motion range;
    an obtaining module to obtain a motion offset of a joystick when the joystick is operated along an operating direction;
    the setting module also to set an association between a motion direction of the movable arm and the operating direction of the joystick according to the motion offset;
    a calculating module to calculate a first speed of the movable arm when the movable arm moves in the normal motion range;
    the setting module further to set a second speed of the movable arm if the movable arm moves in the first deceleration motion range, and set a third speed of the movable arm if the movable arm moves in the second deceleration motion range, and
    a sending module to send a shifting instruction to the control card to control the movable arm to move at the corresponding set speed along the set motion direction according to the corresponding deceleration motion range of the movable arm, and to send a stop instruction to stop movement of the movable arm when the movable arm reaches a limit position.

2. The system of claim 1, wherein the setting module also sets a compensation value to compensate for the motion offset.

3. The system of claim 1, wherein the sending module also sends the stop instruction to stop movement of the movable arm to the control card if the motion offset equals a predetermined value.

4. The system of claim 1, wherein the limit position is a soft limit or a hard limit.

5. The system of claim 1, wherein the setting module is further to set a maximum value of the speeds of the movable arm.

6. The system of claim 1, wherein the setting module sets the motion direction of the movable arm as a predetermined direction if the motion offset of the joystick is more than a predetermined value, and sets the motion direction of the movable arm as an opposite direction of the predetermined direction if the motion offset of the joystick is less than the predetermined value.

7. The system of claim 6, wherein the predetermined value is zero.

8. A method for controlling movement of a measurement machine, the method comprising:
    setting motion ranges of a movable arm moving on a motion shaft of the measurement machine by a computer connected to the measuring machine via a control card, the motion ranges comprising a normal range, a first deceleration motion range and a second deceleration motion range;
    obtaining a motion offset of a joystick when the joystick is operated along an operating direction;
    setting an association between a motion direction of the movable arm and the operating direction of the joystick according to the motion offset;
    calculating a first speed of the movable arm when the movable arm moves in the normal motion range;
    setting a second speed and a third speed of the movable arm and sending a shifting instruction to the control card to control the movable arm to move at the corresponding set speed along the set motion direction according to the corresponding deceleration motion range of the movable arm; and
    sending a stop instruction to stop movement of the movable arm when the movable arm reaches a limit position of the motion shaft.

9. The method of claim 8, further comprising: setting a compensation value to compensate for the motion offset.

10. The method of claim 8, further comprising: sending the stop instruction to stop movement of the movable arm to the control card if the motion offset equals a predetermined value.

11. The method of claim 8, wherein the limit position is a soft limit or a hard limit.

12. The method of claim 8, further comprising: setting a maximum value of the speeds of the movable arm.

13. The method of claim 8, further comprising:
    setting the motion direction of the movable arm as a predetermined direction if the motion offset of the joystick is more than a predetermined value; and
    setting the motion direction of the movable arm as an opposite direction of the predetermined direction if the motion offset of the joystick is less than the predetermined value.

14. A non-transitory computer-readable medium having stored therein instructions that, when executed by a computer, cause the computer to perform a method for controlling movement of a measurement machine, the method comprising:
    setting motion ranges of a movable arm moving on a motion shaft of the measurement machine by a computer connected to the measuring machine via a control card, the motion ranges comprising a normal range, a first deceleration motion range and a second deceleration motion range;
    obtaining a motion offset of a joystick when the joystick is operated along an operating direction;
    setting an association between a motion direction of the movable arm and the operating direction of the joystick according to the motion offset;
    calculating a first speed of the movable arm when the movable arm moves in the normal motion range;
    setting a second speed and a third speed of the movable arm and sending a shifting instruction to the control card to control the movable arm to move at the corresponding set speed along the set motion direction according to the corresponding deceleration motion range of the movable arm; and
    sending a stop instruction to stop movement of the movable arm when the movable arm reaches a limit position of the motion shaft.

15. The non-transitory computer-readable medium of claim 14, further comprising: setting a compensation value to compensate for the motion offset.

16. The non-transitory computer-readable medium of claim 14, further comprising: sending the stop instruction to stop movement of the movable arm to the control card if the motion offset equals a predetermined value.

17. The non-transitory computer-readable medium of claim 14, wherein the limit position is a soft limit or a hard limit.

18. The non-transitory computer-readable medium of claim 14, further comprising: setting a maximum value of the speeds of the movable arm.

19. The non-transitory computer-readable medium of claim 14, further comprising:
  setting the motion direction of the movable arm as a predetermined direction if the motion offset of the joystick is more than a predetermined value; and
  setting the motion direction of the movable arm as an opposite direction of the predetermined direction if the motion offset of the joystick is less than the predetermined value.

* * * * *

UNITED STATES PATENT AND TRADEMARK OFFICE
CERTIFICATE OF CORRECTION

PATENT NO. : 8,121,711 B2
APPLICATION NO. : 12/494285
DATED : February 21, 2012
INVENTOR(S) : Chih-Kuang Chang and Hua-Wei Yang It is certified that error appears in the above-identified patent and that said Letters Patent is hereby corrected as shown below:

Title page, item (73) "Assignees" on the cover page of the Patent replace with the following:

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW).

Signed and Sealed this
Twenty-ninth Day of May, 2012

David J. Kappos
*Director of the United States Patent and Trademark Office*